United States Patent Office 2,978,701
Patented Apr. 4, 1961

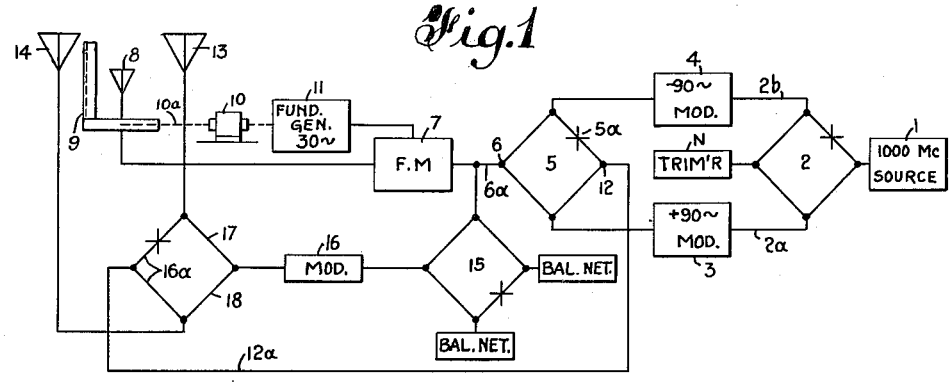

2,978,701

AIR NAVIGATION RADIO SYSTEM

Sidney B. Pickles, Tarrytown, N.Y., assignor to International Telephone and Telegraph Corporation, a corporation of Maryland Filed Apr. 5, 1952, Ser. No. 280,731

15 Claims. (Cl. 343—106)

This invention relates to air navigation radio systems and more particularly to a combined omnirange beacon and localizer system.

Omnirange radio beacons provide bearing information to enable a mobile craft to determine its azimuth to the beacon from any point within radio range. In general, omnidirectional beacons are used for range information and a high degree of accuracy is not essential. However, when approaching an airport a highly accurate localizer beacon is necessary. In the past the localizer beacons have operated at different frequency from the omnirange beacons requiring the pilot of an aircraft to switch his receiver from the omnirange to the localizer frequency. When only a localizer beacon is used, the mobile craft receives no useful information from the beacon except inside a small angle, for example, a 20° angle about the center of the course defined by the localizer beacon. The information available only in this small arc about the beacon is insufficient to give a mobile craft approaching a particular airport all the information necessary.

One of the objects of this invention, therefore, is to overcome the aforementioned objections.

Another object of this invention is to provide a combined omnirange and localizer beacon; and still another object is to provide a receiver for the beacon signals.

A further object of this invention is to provide an omnirange and localizer beacon which will operate on the same carrier frequency.

Acording to a feature of this invention, there is provided a combination omnirange and localizer beacon which will supply bearing information to a craft relative to its position from a station completely around the beacon and a localizer arrangement which will become effective only when a craft is at a significant angle from the course line defined by the beacon.

The above-mentioned and other features and objects of this invention will become more apparent by reference to the following description taken in conjunction with the accompanying drawings, in which:

Fig. 1 is a schematic drawing in block form of a combined omnirange and localizer transmitter according to the principles of this invention;

Fig. 2 is a schematic drawing in block form of one embodiment of a receiver for use with the transmitter of Fig. 1 according to the principles of this invention; and Fig. 3 is a graphic illustration helpful in the explanation of this invention.

Referring to Fig. 1, a block diagram of a beacon transmitter according to the principles of this invention is shown therein comprising a source of carrier frequency energy 1, for example it may be a 1000 mc. source, which is coupled to one terminal of transmission line bridge network 2. Network 2 serves to supply equal amounts of carrier energy into two transmission lines 2a and 2b for separate modulation by two modulators 3 and 4. The output of modulator 3 comprises radio frequency (hereinafter referred to as R-F) energy at the carrier frequency (1000 mc.) plus a positive beacon frequency of a given value, for example 90 cycles, under the carrier, while the output of modulator 4 is the negative phase of this 90 cycle wave. The modulated output waves from modulators 3 and 4 are applied to the opposite diagonal points of a second transmission line bridge 5. In one leg of bridge 5 there is a phase reversal element 5a (e.g. a transmission line transposition) to insure that the input from modulator 3 will not be fed back to modulator 4 and vice versa.

At one of the output terminals 6 of this bridge 5 the carrier components from the modulated wave will add in phase but the side band modulations will cancel one another so that the R-F energy output coupled to line 6a will be at the carrier frequency only.

This energy at the carrier frequency is applied through modulator 7 to an omnidirectional antenna 8. Associated with antenna 8 is a reflector element 9 which is rotated about antenna 8 at a given fundamental frequency by motor 10 and mechanical linkage 10a. The radiation pattern due to omni-directional antenna 8 and rotating reflector 9 is the equivalent of a rotated directed radio frequency energy beam. The spacing between antenna 8 and reflector 9 is such that a desired rotating pattern having a fundamental wave is produced. Motor 10 also drives a fundamental wave generator 11 which provides for example a 30 cycle fundamental wave which is coupled to modulator 7 to frequency modulate the carrier frequency energy supplied to antenna 8. It is to be understood that, if desired, instead of simply transmitting the fundamental comparison wave some other type of synchronizing signal, such as a north indicating signal could be transmitted instead, the principal requirement being that this signal be transmitted so that it can be received and segregated in the receiver of the mobile craft. This part of the circuit, therefore, provides an omnidirectional range beacon which is only the fundamental wave component present.

Referring again to bridge 5, the energy output at terminal 12 will comprise the plus and minus 90 cycle side band components only, because of the elimination of the carrier frequency energy due to the transposition in bridge 5. The side band energy is coupled through transmission line 12a to two separate directive antennas 13 and 14 which are energized antiphasally so that there will be a null in the overall directive antenna pattern aligned with the perpendicular bisector of an imaginary line joining the two antennas 13 and 14. Antennas 13 and 14 may be quite widely spaced so that there will be more than one null present but only the central nulls which are significant will be utilized. Thus antenna 8 and associate circuitry provide an omnirange beacon and antennas 13 and 14 and associate circuitry provide a localizer in a given direction. The sharpness of the localizer pattern is dependent upon the spacing of antennas 13 and 14. In order to overcome the disadvantage of a null type phase comparison beacon in which no indication is given if the craft is directly on course or in which a dangerous null "on course" indication might be given if the receiver breaks down, a portion of the R-F energy from line 6a is tapped off and coupled to a third bridge network 15.

Bridge network 15 serves to prevent modulation from being fed back to the other portions of the circuit. This R-F energy is modulated by modulator 16 with a distinctive signal and transmitted over lines 17 and 18 to energize antennas 13 and 14 cophasally. Lines 17 and 18 are so chosen that they, together with line 16a which normally interconnects antennas 13 and 14, form a fourth bridge network so that the energy output of modulator 16 is not fed back to distort the fundamental beacon pattern. Due to the cophasal energization of antennas 13 and 14 by the energy from modulator 16, this third signal will be strong at the point where the localizer signals are at a null.

Referring to Fig. 2, a receiver for use with the transmitter of Fig. 1 according to the principles of this invention shown therein comprises an omnidirectional receiving antenna 19a coupled to a receiver detector 19. The detected output, providing the various envelope waves, is coupled to a fundamental frequency filter 20 which separates the fundamental bearing signal which is then coupled to a coil 21 of a 360° phase meter 20a. The output of detector 19 is also fed to an FM discriminator 23 through limiter circuit 22 to derive the reference wave. The separated reference wave has its phase split and is applied to coils 24 and 25 of the phase meter 20a. Pointer 26 carried by or responsive to rotor coil 21 indicates the phase difference between the bearing and reference signals, thus indicating the azimuth of the transmitter from the receiver. The localizer bearing signal and the third signal or fill-in from antennas 13 and 14 are separated from the detector 19 output by band pass filter 27 which serves to pass the 90 cycle beacon frequency and the fill-in frequency. The passing 90 cycle energy from filter 27 is coupled to a coil 27a of a phase discriminator shown generally at 28. This energy is applied to two secondary coils 29 and 30 so that a plus 90 cycle or the minus 90 cycle whichever is greater will be fed in opposite directions through the coils 29 and 30. A 90 cycle comparison signal is obtained from the output of discriminator 23 by use of multiplier 23a and is inductively coupled to the phase discriminator 28 by means of coils 31. Thus in the output resistor 32 a signal envelope will appear whose polarity (positive or negative) will depend upon in which direction the mobile craft departs from the center of the localizer course and is used to control the left-right indicator 33. However, when both the positive and negative 90 cycle energies are equal, meter 33 will read zero, and under these conditions the operator does not know if the instrument has broken down or is in still good working order. To avoid this difficulty, the third signal or fill-in is applied to the discriminator 28 through coil 27a. Whenever this signal is present, current will flow in the central arm 34a of the phase discriminator 28. A resistor 34 is provided in arm 34a across which a voltage drop will appear when this third signal is being received. This voltage is applied through a null signal filter 35 which selects the component dependent upon the reception of this null signal and applies it to meter 36 so that the operator knows that the third signal is being received, and thus the received signal is operative. Meter 36 may be a flag alarm movement contained in the case of meter 33.

Referring to Fig. 3, the radiation pattern of the localizer portion of the transmitter of Fig. 1 is shown therein. This pattern is significant only within a given angle 37. Any craft approaching the omnirange and localizer along the line, for example, 38 may be instructed that at a certain distance from the beacon indicated at point 39 he should turn so as to be aligned with the localizer course. As he follows the line 39a in toward the localizer course at some point, such as 40, he will reach an area where the localizer signals are significant. Due to the separation of the localizer antennas 13 and 14, false courses may appear in the area outside of radiation lobe 40. This serves only to confuse the operator without having any useful function. Provision is made in the receiving system shown in Fig. 2 to overcome this difficulty. A shutter 40a is provided which normally covers meter 33 and is retained in position, for example, by spring 41 and arm 41a. In the meter 20a there is provided a contact element 42 which is manually adjustable. From information received from the beacon system or knowledge received from the charts at this station, the operator may position this contact 42 so that it will be aligned with localizer beacon at the particular station. This contact 42 may also be actuated by a servo system from a telemeter signal, thus eliminating the need for manual adjustment. The contact 42 is made sufficiently wide to cover a significant angular range of the localizer zone. If this localizer zone is approached, pointer 26 will rotate toward contact 42. When the craft reaches a position where pointer 26 touches contact 42, a circuit, provided from ground to battery 43 and relay 44 to contact 42, pointer 26 and back to ground, will energize relay 44 and open shutter 40a so that meter 33 can be read.

While I have described above the principles of my invention in connection with specific apparatus, it is to be clearly understood that this description is made only by way of example and not as a limitation to the scope of my invention as set forth in the objects thereof and in the accompanying claims.

I claim:

1. A combined omni-range and localizer beacon system comprising a source of radio frequency carrier energy, a first antenna system capable of emitting a directive radio frequency energy beam, means associated with said antenna system for rotating said beam at a fundamental frequency, means responsive to said rotating means for modulating said radio frequency energy with a reference signal at said fundamental frequency, means to couple said modulated radio frequency energy to said antenna system, second means to modulate said radio frequency carrier energy to produce side band frequencies, a second antenna system having a radiation pattern defining a null type course line, means to apply said side band frequencies to said second antenna system, a receiver for detecting the envelope wave of said rotating beam to obtain a position indication of said receiver relative to said beacon system, means to produce in synchronism with said detected reference signal a reference frequency substantially equal to said side band frequencies and means to compare said side band frequencies with said reference frequency to obtain an indication of said receiver relative to said course line.

2. A system according to claim 1, which further includes third means to modulate said radio frequency carrier energy with a third signal, and means to apply said third signal modulated radio frequency carrier energy to said second antenna system to produce a distinctive signal in the null region of the second antenna system radiation pattern.

3. A system according to claim 2, wherein said means to apply said third signal modulated radio frequency carrier energy to said second antenna system includes a bridge network to prevent feedback of the side band frequencies applied to said second antenna system.

4. A system according to claim 2, wherein the receiver includes an indicator for said third signal and means for detecting said third signal in the received radio frequency carrier energy for application to said third signal indicator.

5. A system according to claim 4, wherein the means for comparing the phase of said reference signal and the envelope wave for position indication includes an indicator having a control circuit controlled by a movable part of said indicator, an adjustable terminal for association with said movable part adapted to complete said control circuit when the receiver is within angular range of the radiation pattern of said second antenna system, and the means for comparing the side band frequencies with said reference frequency includes a shutter normally shielding the position indicator thereof and means responsive to energization of said control circuit to actuate said shutter to unshield said position indicator.

6. A system according to claim 2, wherein the second antenna system includes two antennas arranged for directional radiation, the means for applying said side band frequencies and said third signal modulated radio frequency carrier energy to said second antenna system includes a first bridge circuit having two input and two output terminals, means coupling each of said two antennas to an output terminal, means coupling said side band frequencies to one of said input terminals for application to said two antennas in anti-phasal relation, and means to apply said third signal modulated radio frequency carrier energy to the other of said input terminals for application to said two antennas in cophasal relation.

7. A system according to claim 6, wherein the sources of radio frequency carrier energy and side band frequency energies include a second bridge circuit having two output terminals, one of which supplies radio frequency carrier energy and the other supplies side band frequency energy, and the source of radio frequency carrier energy for said third signal modulating means includes a third bridge circuit coupled to the radio frequency carrier energy output terminal of said second bridge circuit.

8. A system according to claim 1, wherein the means for comparing the phase of said reference signal and the envelope wave for position indication includes an azimuth indicator having a control circuit controlled by a movable part of said azimuth indicator, an adjustable terminal for association with said movable part adapted to complete said control circuit when the receiver is within range of the radiation pattern of said second antenna system, and the means for comparing the side band frequencies with said reference frequency to obtain an indication of position of said receiver relative to said course line includes a position indicator, a shutter normally shielding the position indicator and means responsive to energization of said control circuit to actuate said shutter to unshield said position indicator.

9. A system according to claim 1, wherein the means to produce a reference frequency for comparison with said side band frequency includes means for multiplying the frequency of said reference signal to the reference frequency.

10. In a beacon system, a source of radio frequency carrier energy, means for modulating said radio frequency carrier energy to produce side band frequencies above and below said carrier frequency, a directional antenna system having two antennas having a radiation pattern defining a null type course line, means to apply said side band frequencies to said two antennas, a third signal modulator, means to apply said radio frequency carrier energy to said third signal modulator and means to apply the output of said third modulator to said two antennas to produce a distinctive signal in said null portion of said directional radiation pattern.

11. A system according to claim 10, wherein the means for applying said side band frequencies and said third signal modulated radio frequency carrier energy to said two antennas includes a bridge circuit having two input and two output terminals, means coupling each of said two antennas to one of said output terminals, means coupling said side band frequencies to one of said input terminals for application to said two antennas in anti-phasal relation, and means to apply said third signal modulated radio frequency carrier to the other of said input terminals for application to said two antennas in cophasal relation.

12. A receiver to cooperate with a beacon system radiating a rotating radio frequency carrier energy pattern, a reference signal synchronized with the rotation of said pattern and a directional radiation pattern containing side band frequencies defining a null type of course line, comprising means for detecting the envelope wave of said rotating radio frequency carrier, said side band frequencies and said reference signal, means for comparing the phase of said reference signal and the envelope wave of said rotating radiation to obtain a position indication of said receiver relative to said beacon system, means to produce in synchronism with said detected reference signal a reference frequency substantially equal to said side band frequencies and means to compare the polarity of one of said side band frequencies having the greatest amplitude with said reference frequency to obtain an indication of position of said receiver relative to said course line.

13. A system according to claim 12, wherein the means for comparing the phase of said reference signal and the envelope wave for position indication includes an azimuth indicator having a control circuit controlled by a movable part of said azimuth indicator, an adjustable terminal for association with said movable part adapted to complete said control circuit when the receiver is within range of said directional radiation pattern, and means for comparing the side band frequencies with said reference frequency includes a position indicator, a shutter normally shielding the position indicator and means responsive to energization of said control circuit to actuate said shutter to unshield said position indicator.

14. A system according to claim 12, wherein the radiation includes a third signal modulated radio frequency carrier energy covering the null portion of said directional radiation pattern and the receiver includes an indicator for said third signal and means for detecting said third signal in the received radio frequency carrier energy for application to said third signal indicator.

15. A combined omni-range and localizer beacon system comprising a source of radio frequency carrier energy, a first antenna system capable of emitting a directive radio frequency energy beam, means associated with said first antenna system for rotating said beam at a fundamental frequency, means responsive to said rotating means for modulating said radio frequency energy with a reference signal at said fundamental frequency, means to couple said modulated radio frequency energy to said first antenna system whereby at any point within the field of radiation the phase of the detected envelope wave of the rotating beam with respect to the reference signal is indicative of the position of said point relative to said first antenna system, means to modulate said radio frequency carrier energy to produce side band frequencies, a second antenna system having a radiation pattern defining a null type course line, means to apply said side band frequencies to said second antenna system, means to modulate energy of said radio frequency carrier energy with a third signal, and means to apply said third signal modulated radio frequency carrier energy to said second antenna system to produce a distinctive signal in said null portion of the directional radiation pattern.

References Cited in the file of this patent

UNITED STATES PATENTS

| | | |
|---|---|---|
| 2,444,431 | Dubin | July 6, 1948 |
| 2,485,612 | Labin et al. | Oct. 25, 1949 |